United States Patent
Shin et al.

(10) Patent No.: US 9,606,323 B2
(45) Date of Patent: Mar. 28, 2017

(54) PHOTOGRAPHING LENS GROUP AND ELECTRONIC APPARATUS INCLUDING THE SAME

(71) Applicant: SAMSUNG ELECTRONICS CO., LTD., Suwon-si, Gyeonggi-do (KR)

(72) Inventors: Hyun-jun Shin, Goyang-si (KR); Jeong-kil Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/464,953

(22) Filed: Aug. 21, 2014

(65) Prior Publication Data

US 2015/0138431 A1    May 21, 2015

(30) Foreign Application Priority Data

Nov. 21, 2013 (KR) .......... 10-2013-0142334

(51) Int. Cl.
| | |
|---|---|
| *G02B 3/02* | (2006.01) |
| *G02B 13/18* | (2006.01) |
| *G02B 9/62* | (2006.01) |
| *G02B 13/00* | (2006.01) |
| *G02B 5/00* | (2006.01) |
| *G02B 3/04* | (2006.01) |

(52) U.S. Cl.
CPC .......... *G02B 9/62* (2013.01); *G02B 13/0045* (2013.01); *G02B 3/04* (2013.01); *G02B 5/005* (2013.01); *G02B 13/001* (2013.01); *G02B 13/18* (2013.01)

(58) Field of Classification Search
CPC .... G02B 13/0045; G02B 13/18; G02B 5/005; G02B 13/001; G02B 3/04
USPC .......... 359/713, 738, 739, 756–758
See application file for complete search history.

(56) References Cited

U.S. PATENT DOCUMENTS

| | | | | |
|---|---|---|---|---|
| 5,272,568 | A * | 12/1993 | DeJager ................ | G02B 13/24 359/740 |
| 2012/0188654 | A1 | 7/2012 | Huang | |
| 2012/0243108 | A1 | 9/2012 | Tsai et al. | |
| 2012/0314301 | A1 | 12/2012 | Huang et al. | |
| 2012/0314304 | A1 | 12/2012 | Huang | |
| 2013/0033762 | A1 | 2/2013 | Tsai et al. | |
| 2013/0070346 | A1 | 3/2013 | Hsu et al. | |
| 2014/0192422 | A1 * | 7/2014 | Tang ................ | G02B 9/62 359/713 |

* cited by examiner

*Primary Examiner* — Evelyn A Lester
(74) *Attorney, Agent, or Firm* — Drinker Biddle & Reath LLP

(57) ABSTRACT

A photographing lens group and an electronic apparatus including the same are provided. The photographing lens group includes a first lens having a positive refractive power, a second lens having a negative refractive power, a third lens having a positive or negative refractive power, a fourth lens having a positive or negative refractive power, a fifth lens having a negative refractive power, and a sixth lens having a positive refractive power. The first, second, third, fourth, fifth, and sixth lenses are sequentially arranged from an object side to an image side of the photographing lens group. The photographing lens group satisfies an inequality of $1.0 < CT_6/CT_5 < 3.5$ where $CT_5$ is a thickness of the fifth lens with respect to an optical axis and $CT_6$ is a thickness of the sixth lens with respect to the optical axis.

16 Claims, 9 Drawing Sheets

PHOTOGRAPHING LENS GROUP AND ELECTRONIC APPARATUS INCLUDING THE SAME

CROSS-REFERENCE TO RELATED PATENT APPLICATIONS

This application claims the priority benefit of Korean Patent Application No. 10-2013-0142334, filed on Nov. 21, 2013, in the Korean Intellectual Property Office, the disclosure of which is incorporated by reference herein in its entirety.

BACKGROUND

1. Field

One or more embodiments of the present disclosure relate to a compact high-performance photographing lens group, and an electronic apparatus including the same.

2. Related Art

Many photographing apparatuses use solid-state imaging devices such as charge-coupled device (CCD) image sensors or complementary metal-oxide semiconductor (CMOS) image sensors. Examples of photographing apparatuses include digital still cameras, video cameras, and interchangeable lens cameras. With the trend toward miniaturization, photographing apparatuses using solid-state imaging devices are applied to small information terminals such as mobile phones. Users desire high-performance cameras having high resolution and a wide angle lens. Also, the professionalism of users of cameras has gradually increased.

Due to the development of compact-sized imaging devices capable of producing images having a high number of pixels, high-resolution and high-performance photographing lenses are in demand. However, a photographing lens that includes four or five lenses may not be able to meet high-performance requirements that are demanded by users. Also, it may be difficult to provide a photographing lens which may be mounted in a slim portable terminal (e.g., a mobile phone) while having satisfactory optical properties and aberration properties.

SUMMARY

One or more embodiments of the present disclosure include a compact high-performance photographing lens group.

One or more embodiments of the present disclosure include an electronic apparatus that includes a compact high-performance photographing lens group.

Additional embodiments will be set forth in part in the description which follows and, in part, will be apparent from the description, or may be learned by practice of the presented embodiments.

According to one or more embodiments, a photographing lens group includes a first lens having a positive refractive power; a second lens having a negative refractive power; a third lens having a positive or negative refractive power; a fourth lens having a positive or negative refractive power; a fifth lens having a negative refractive power; and a sixth lens having a positive refractive power. The first, second, third, fourth, fifth, and sixth lenses are sequentially arranged from an object side to an image side of the photographing lens group, and the photographing lens satisfies an inequality of $1.0<CT_6/CT_5<3.5$, where $CT_5$ is a thickness of the fifth lens with respect to an optical axis, and $CT_6$ is a thickness of the sixth lens with respect to the optical axis.

The photographing lens group may satisfy an inequality of $0.1<TTL/DI<0.8$, where TTL is a distance from an object side surface of the first lens to an image plane, and DI is a diagonal length of an image sensor.

The photographing lens group may satisfy an inequality of $0<|f_1/f_3|+|f_1/f_4|<1.0$, where $f_1$ is a focal length of the first lens, $f_3$ is a focal length of the third lens, and $f_4$ is a focal length of the fourth lens.

The photographing lens group may satisfy an inequality of $0<|f/f_5|+|f/f_6|<1.0$, where $f_5$ is a focal length of the fifth lens, $f_6$ is a focal length of the sixth lens, and f is a focal length of the photographing lens group.

The photographing lens group may satisfy an inequality of $25<|V_{d4}-V_{d5}|<50$, where $V_{d4}$ is an Abbe number of the fourth lens, and $V_{d5}$ is an Abbe number of the fifth lens.

The first, second, third, fourth, fifth, and sixth lenses may each have at least one aspheric surface.

The first, second, third, fourth, fifth, and sixth lenses may be bi-aspheric lenses.

The fifth lens may have a meniscus shape having a convex surface facing the image side.

A stop, provided at an object side of the first lens, or between the first lens and the second lens, may be further included.

The first lens may have a convex surface facing the object side.

The first lens may be a biconvex lens.

The second lens may have a concave surface facing the image side.

The second lens may be a meniscus lens or a biconcave lens.

The sixth lens may include at least one inflection point on at least one of an image side surface or an object side surface thereof.

An image side surface of the sixth lens may be concave near the optical axis.

An object side surface of the sixth lens may be convex near the optical axis.

According to one or more embodiments, an electronic apparatus includes a photographing lens group and an image sensor that receives an image formed by the photographing lens group and converts the image into an electric image signal. The photographing lens group includes a first lens having a positive refractive power; a second lens having a negative refractive power; a third lens having a positive or negative refractive power; a fourth lens having a positive or negative refractive power; a fifth lens having a negative refractive power; and a sixth lens having a positive refractive power. The first, second, third, fourth, fifth, and sixth lenses are sequentially arranged from an object side to an image side of the photographing lens. The photographing lens satisfies an inequality of $1.0<CT_6/CT_5<3.5$, where $CT_5$ is a thickness of the fifth lens with respect to an optical axis, and $CT_6$ is a thickness of the sixth lens with respect to the optical axis.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1:
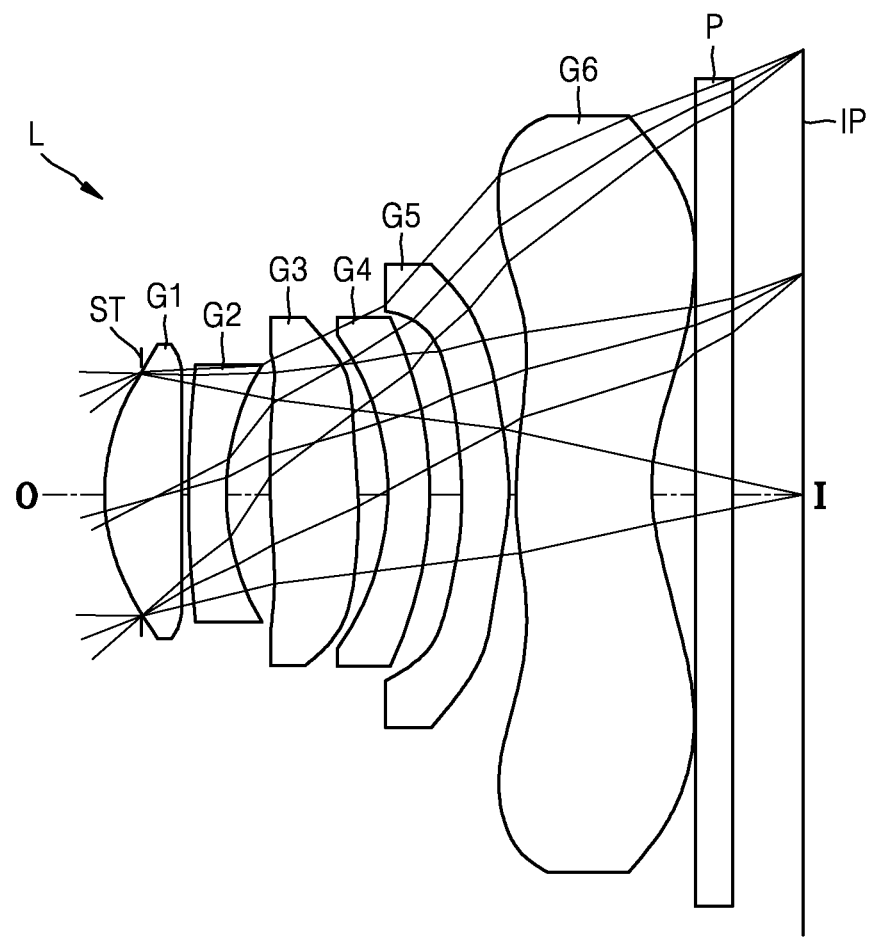
FIG. 1 is a diagram of a photographing lens group according to an embodiment.

Reference will now be made in detail to various embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

FIG. 1 is a diagram of a photographing lens group L according to an embodiment.

The photographing lens group L includes a first lens G1 having a positive refractive power, a second lens G2 having a negative refractive power, a third lens G3 having a positive or negative refractive power, a fourth lens G4 having a positive or negative refractive power, a fifth lens G5 having a negative refractive power, and a sixth lens G6 having a positive refractive power, which are sequentially arranged from an object side O to an image side I of the photographing lens group L. The first lens G1 may have a convex surface facing the object side O. For example, the first lens G1 may be a biconvex lens. The second lens G2 may have a concave surface facing the image side I. For example, the second lens G2 may be a meniscus lens or a biconcave lens. The fifth lens G5 may have a meniscus shape having a convex surface facing the image side I. The fifth lens G5 may reduce an angle at which rays of light are incident on the sixth lens G6 so that a large amount of light is obtained in the center and surroundings of an image plane, and thus, may prevent an image of the surroundings from being dark or distorted.

The sixth lens G6 may have at least one inflection point on at least one of an object side surface or an image side surface thereof. For example, the object side surface of the sixth lens G6 may have at least one inflection point. Alternatively, the image side surface of the sixth lens G6 may have at least one inflection point. Alternatively, the object side surface and the image side surface of the sixth lens G6 may both have inflection points. The term "inflection point" refers to a point at which a sign of a radius of curvature changes from positive (+) to negative (−) or from negative (−) to positive (+). The image side surface of the sixth lens G6 may be concave near an optical axis of the photographing lens group L. The object side surface of the sixth lens G6 may be convex near the optical axis.

An image of an object may pass through the first, second, third, fourth, fifth, and sixth lenses G1 to G6, and be incident on an image plane IP. The image plane IP may be, for example, an imaging device surface or an image sensor surface.

At least one optical filter P may be provided between the sixth lens G6 and the image plane IP. The optical filter P may include at least one of, for example, a low pass filter, an infrared (IR) cut filter, or a cover glass. When the IR cut filter is provided as the optical filter P, visible rays are transmitted, but infrared rays are filtered out so that the infrared rays are not transmitted to the image plane IP. However, some embodiments of the photographing lens group are configured without an optical filter.

The photographing lens group L may include a stop ST. For example, the stop ST may be disposed at the object side O of the first lens G1, or between the first lens G1 and the second lens G2.

The first, second, third, fourth, fifth, and sixth lenses G1 to G6 may each include at least one aspheric surface. For example, the first, second, third, fourth, fifth, and sixth lenses G1 to G6 may be bi-aspheric lenses and accordingly, provide a compact and high-performance photographing lens group. Alternatively, at least one of the first, second, third, fourth, fifth, or sixth lenses G1 to G6 may be formed by using a plastic material to thus reduce cost and facilitate manufacturing of aspheric surfaces.

The photographing lens group L according to an embodiment may satisfy the following inequality:

$$1.0 < CT_6/CT_5 < 3.5 \qquad \text{<Inequality 1>}$$

where $CT_5$ is a thickness of the fifth lens G5 with respect to the optical axis, and $CT_6$ is a thickness of the sixth lens G6 with respect to the optical axis.

Inequality 1 defines a ratio of the thickness of the fifth lens G5 on the optical axis to the thickness of the sixth lens G6 on the optical axis. When $(CT_6/CT_5)$ is less than a lower limit value (e.g., 1.0) of Inequality 1, the fifth lens G5 is formed such that a refractive power thereof is greater than that of the sixth lens G6 so as to correct spherical aberration occurring in the photographing lens group. Accordingly, it may be difficult to correct astigmatism.

The photographing lens group L may satisfy the following inequality:

$$0.1 < TTL/DI < 0.8 \qquad \text{<Inequality 2>}$$

where TTL is a distance from the object side surface of the first lens G1 to the image plane IP, and DI is a diagonal length of an image sensor.

When (TTL/DI) is greater than an upper limit value (e.g., 0.8), the size of the photographing lens group L increases. When (TTL/DI) is less than a lower limit value (e.g., 0.1), the distance from the object side surface of the first lens G1 to the image plane IP may be too small for the photographing lens group L to be efficiently manufactured.

The photographing lens group L may satisfy the following inequality:

$$0 < |f_1/f_3| + |f_1/f_4| < 1.0 \qquad \text{<Inequality 3>}$$

where $f_1$ is a focal length of the first lens G1, $f_3$ is a focal length of the third lens G3, and $f_4$ is a focal length of the fourth lens G4.

$(|f_1/f_3| |f_1/f_4|)$ may be limited to not exceed an upper limit value (e.g., 1.0) of Inequality 3 so that a refractive power of the first lens G1 is reduced, thus facilitating correction of spherical aberration and coma aberration.

The photographing lens group L may satisfy the following inequality:

$$0 <" |f/f_5| + |f/f_6| < 1.0 \qquad \text{<Inequality 4>}$$

where $f_5$ is a focal length of the fifth lens G5, $f_6$ is a focal length of the sixth lens G6, and f is a focal length of the photographing lens group L.

When $(|f/f_5|+|f/f_6|)$ exceeds an upper limit value (e.g., 1.0) of Inequality 4, it may be difficult to correct astigmatism, and thus, high definition images may not be properly displayed by the electronic apparatus. When $(|f/f_5|+|f/f_6|)$ is within the range of Inequality 4, respective refractive powers of the fifth and sixth lenses G5 and G6 may be appropriately distributed so that the photographing lens group L may have relatively low sensitivity and thus more easily manufactured.

The photographing lens group L may satisfy the following inequality:

$$25<|V_{d4}-V_{d5}|<50 \quad \text{<Inequality 5>}$$

where $V_{d4}$ is an Abbe number of the fourth lens G4, and $V_{d5}$ is an Abbe number of the fifth lens G5.

When $(|V_{d4}-V_{d5}|)$ satisfies Inequality 5, chromatic aberration may be corrected to reduce color blurring that is caused by wavelengths of rays of light passing through the photographing lens group L.

The aspheric surface used in the photographing lens group L according to an embodiment is defined as follows.

An aspheric shape may be expressed by the following equation when a direction along an optical axis is an x-axis and a direction perpendicular to the optical axis is a y-axis, and light travels in a positive direction along the x-axis. Here, "x" is a distance from a vertex of a lens to a point of the lens along the optical axis; "y" is a distance from the vertex of the lens to the point of the lens along a direction perpendicular to the optical axis; "K" is a conic constant; "a," "b," "c," and "d" are aspheric coefficients; and "C" is a reciprocal (1/R) of a radius of curvature R at the vertex of the lens.

$$x = \frac{Cy^2}{1+\sqrt{1-(K+1)C^2y^2}} + ay^4 + by^6 + cy^8 + dy^{10} \quad \text{<Equation 6>}$$

The photographing lens group L is provided according to any of the following various embodiments. In each embodiment, lens surface numbers ($S_1, S_2, S_3 \ldots S_n$) are sequentially assigned from the object side O to the image side I.

FIG. 1 is a diagram of the photographing lens group L according to an embodiment, and design data of FIG. 1 is shown in Table 1 below. According to the present embodiment, an effective focal length (f) of the photographing lens group L is 4.276 mm, a focal length ($f_1$) of the first lens G1 is 3.166 mm, a focal length ($f_2$) of the second lens G2 is −5.229 mm, a focal length ($f_3$) of the third lens G3 is 7.301 mm, a focal length ($f_4$) of the fourth lens G4 is −200.120 mm, a focal length ($f_5$) of the fifth lens G5 is −10.378 mm, and a focal length ($f_6$) of the sixth lens G6 is 200.000 mm.

TABLE 1

| Lens surface number | Radius of Curvature | Thickness | Refractive Index | |
|---|---|---|---|---|
| S1 | 1.736 | 0.583 | 1.535 | First lens G1 |
| S2 | −73.927 | 0.040 | | |
| S3 | 4.695 | 0.300 | 1.635 | Second lens G2 |
| S4 | 1.907 | 0.330 | | |
| S5 | 9.539 | 0.681 | 1.547 | Third lens G3 |
| S6 | −6.687 | 0.244 | | |
| S7 | −2.423 | 0.300 | 1.547 | Fourth lens G4 |
| S8 | −2.587 | 0.265 | | |
| S9 | −1.555 | 0.350 | 1.635 | Fifth lens G5 |
| S10 | −2.207 | 0.040 | | |
| S11 | 1.895 | 1.046 | 1.535 | Sixth lens G6 |
| S12 | 1.557 | 0.331 | | |
| S13 | Infinity | 0.300 | 1.518 | Optical filter P |
| S14 | Infinity | 0.540 | | |
| S15 | Infinity | 0.000 | | Image plane IP |

In Table 1, a reference wavelength of the refractive index is 587.6 nm.

Table 2 shows a conic constant K and aspheric coefficients A, B, C, D, and E of the present embodiment.

TABLE 2

| | K | A | B | C | D | E |
|---|---|---|---|---|---|---|
| S1 | 0.063077 | 0.001274 | 0.013485 | −0.027771 | 0.016101 | 0.013811 |
| S2 | 0.000000 | 0.025661 | −0.000507 | −0.014027 | −0.007750 | 0.010166 |
| S3 | −19.765229 | −0.022719 | 0.045875 | −0.035382 | 0.000482 | −0.005467 |
| S4 | −5.947173 | 0.039006 | 0.014718 | 0.022455 | −0.019406 | −0.002577 |
| S5 | 0.000000 | −0.022185 | −0.005573 | 0.000000 | 0.000000 | 0.000000 |
| S6 | 0.000000 | −0.011719 | −0.037463 | 0.000000 | 0.000000 | 0.000000 |
| S7 | 0.219156 | −0.008622 | 0.011580 | −0.036290 | 0.002994 | 0.023619 |
| S8 | −4.216601 | 0.022079 | −0.053910 | 0.042204 | −0.029166 | 0.016797 |
| S9 | −15.227901 | 0.081998 | −0.075690 | 0.015475 | −0.010376 | 0.004905 |
| S10 | −1.936799 | 0.134812 | −0.072230 | 0.011547 | −0.000280 | −0.000413 |
| S11 | −19.773380 | −0.059437 | 0.004918 | 0.001533 | −0.000203 | −0.000005 |
| S12 | −6.452993 | −0.031763 | 0.007085 | −0.001614 | 0.000244 | −0.000023 |

In the present embodiment, respective values of Inequalities 1, 2, 3, 4, and 5 satisfy:

$CT_6/CT_5=2.988$ $TTL/DI=0.78$ $|f_1/f_3|+|f_1/f_4|=0.449$ $|f/f_5|+|f/f_6|=0.433$ $|V_{d4}-V_{d5}|=32.1$

Figure 2:
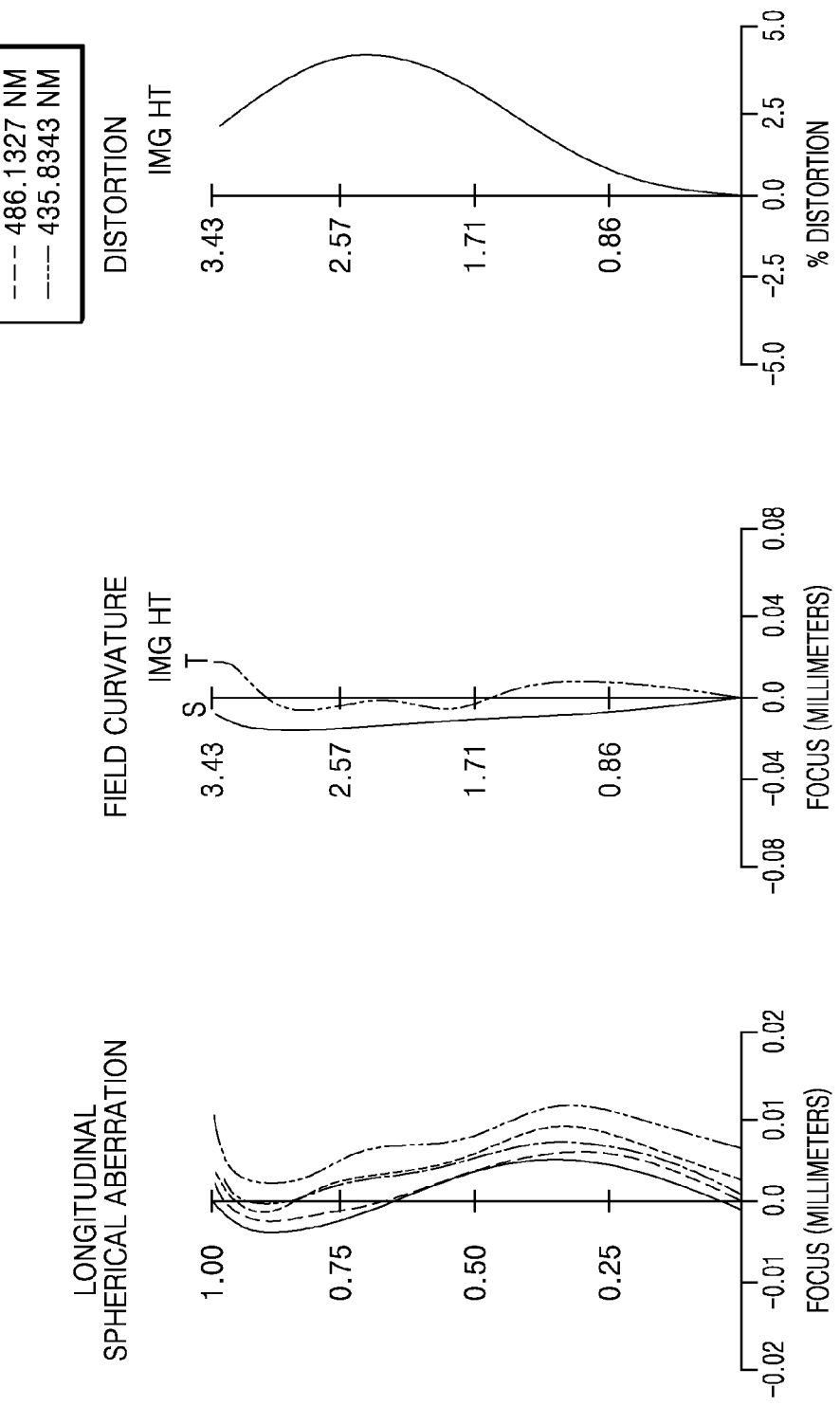
FIG. 2 is a graph of aberration of the photographing lens group of FIG. 1.

FIG. 2 is a graph of longitudinal spherical aberration, field curvature, and distortion of the photographing lens group L of FIG. 1. Examples of field curvature include tangential field curvature T and sagittal field curvature S.

Figure 3:
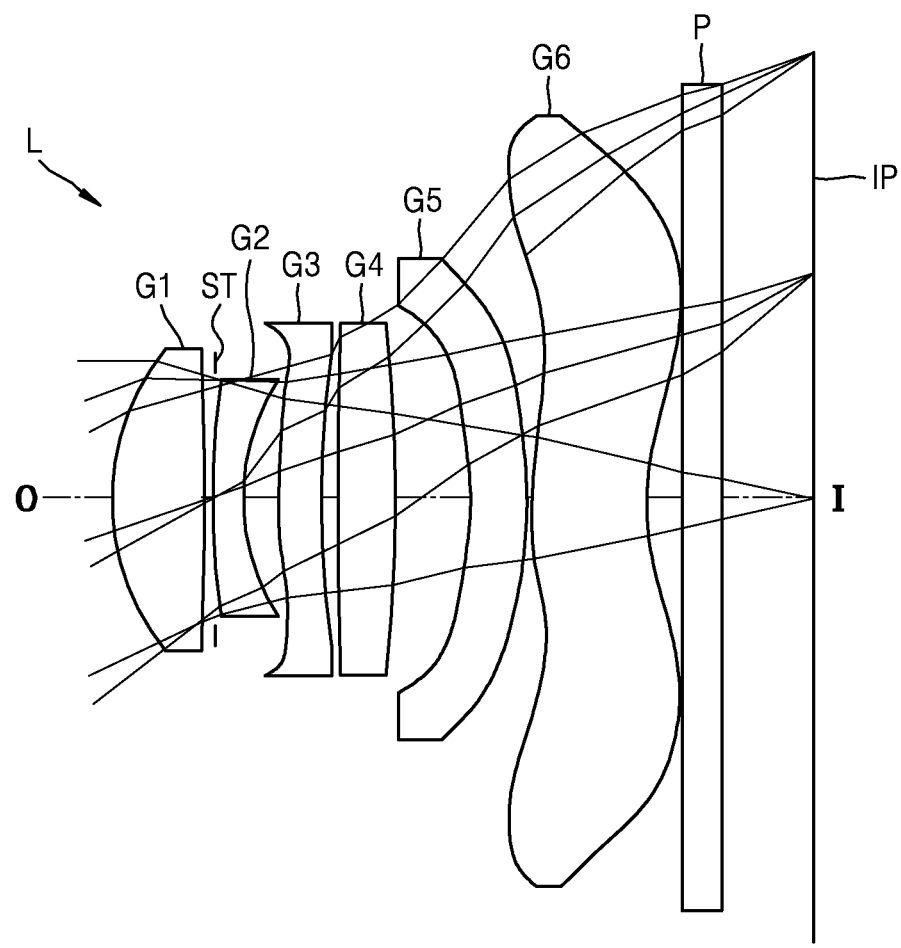
FIG. 3 is a diagram of a photographing lens group according to another embodiment.

FIG. 3 is a diagram of a photographing lens group L according to another embodiment, and design data of FIG. 3 is shown in Table 3 below. According to the present embodiment, an effective focal length (f) of the photographing lens group L is 4.530 mm, a focal length ($f_1$) of a first lens G1 is 3.094 mm, a focal length ($f_2$) of a second lens G2 is −4.905 mm, a focal length ($f_3$) of a third lens G3 is −89.605 mm, a focal length ($f_4$) of a fourth lens G4 is 12.859 mm, a focal length ($f_5$) of a fifth lens G5 is −18.606 mm, and a focal length ($f_6$) of a sixth lens G6 is 67.524 mm.

TABLE 3

| Lens Surface Number | Radius of Curvature | Thickness | Refractive Index | |
|---|---|---|---|---|
| S1 | 1.755 | 0.690 | 1.535 | First lens G1 |
| S2 | −25.000 | 0.030 | | |
| S3 | 3.118 | 0.260 | 1.635 | Second lens G2 |
| S4 | 1.508 | 0.292 | | |
| S5 | 7.167 | 0.300 | 1.535 | Third lens G3 |
| S6 | 6.143 | 0.150 | | |
| S7 | 8.647 | 0.447 | 1.535 | Fourth lens G4 |
| S8 | −33.001 | 0.560 | | |
| S9 | −2.228 | 0.441 | 1.635 | Fifth lens G5 |
| S10 | −2.957 | 0.030 | | |
| S11 | 1.781 | 0.900 | 1.535 | Sixth lens G6 |
| S12 | 1.543 | 0.287 | | |
| S13 | infinity | 0.300 | 1.517 | Optical filter |
| S14 | infinity | 0.713 | | |
| S15 | infinity | 0.000 | | image plane IP |

Table 4 shows a conic constant K and aspheric coefficients A, B, C, D, and E of the present embodiment.

TABLE 4

| | K | A | B | C | D | E |
|---|---|---|---|---|---|---|
| S1 | 0.081600 | 0.000888 | 0.005521 | −0.009421 | 0.010328 | −0.005778 |
| S2 | −79.130000 | 0.033241 | −0.011971 | −0.001873 | 0.004046 | −0.000386 |
| S3 | −15.810000 | −0.026301 | 0.028048 | −0.027209 | 0.016521 | −0.000089 |
| S4 | −4.614000 | 0.037823 | −0.003346 | 0.017675 | −0.009302 | 0.003693 |
| S5 | 0.000000 | 0.006817 | −0.007447 | −0.007573 | −0.009711 | 0.016146 |
| S6 | 0.000000 | −0.025182 | 0.008321 | −0.003433 | 0.000836 | 0.001900 |
| S7 | 0.000000 | −0.059992 | −0.004720 | 0.013456 | 0.007071 | 0.000796 |
| S8 | 253.400000 | −0.012390 | −0.054791 | 0.049486 | −0.027745 | 0.015878 |
| S9 | −31.840000 | 0.039485 | −0.065464 | 0.019195 | −0.010706 | 0.004115 |
| S10 | 0.122200 | 0.093651 | −0.058599 | 0.012282 | −0.000379 | −0.000442 |
| S11 | −15.320000 | −0.059335 | 0.004014 | 0.001517 | −0.000193 | −0.000003 |
| S12 | −7.335000 | −0.036948 | 0.007006 | −0.001689 | 0.000246 | −0.000022 |

In the present embodiment, respective values of Inequalities 1, 2, 3, 4, and 5 satisfy:

$CT_6/CT_5=2.041$ $TTL/DI=0.787$ $|f_1/f_3|+|f_1/f_4|=0.275$ $|f/f_5|+|f/f_6|=0.351$ $|V_{d4}-V_{d5}|=32.1$

Figure 4:
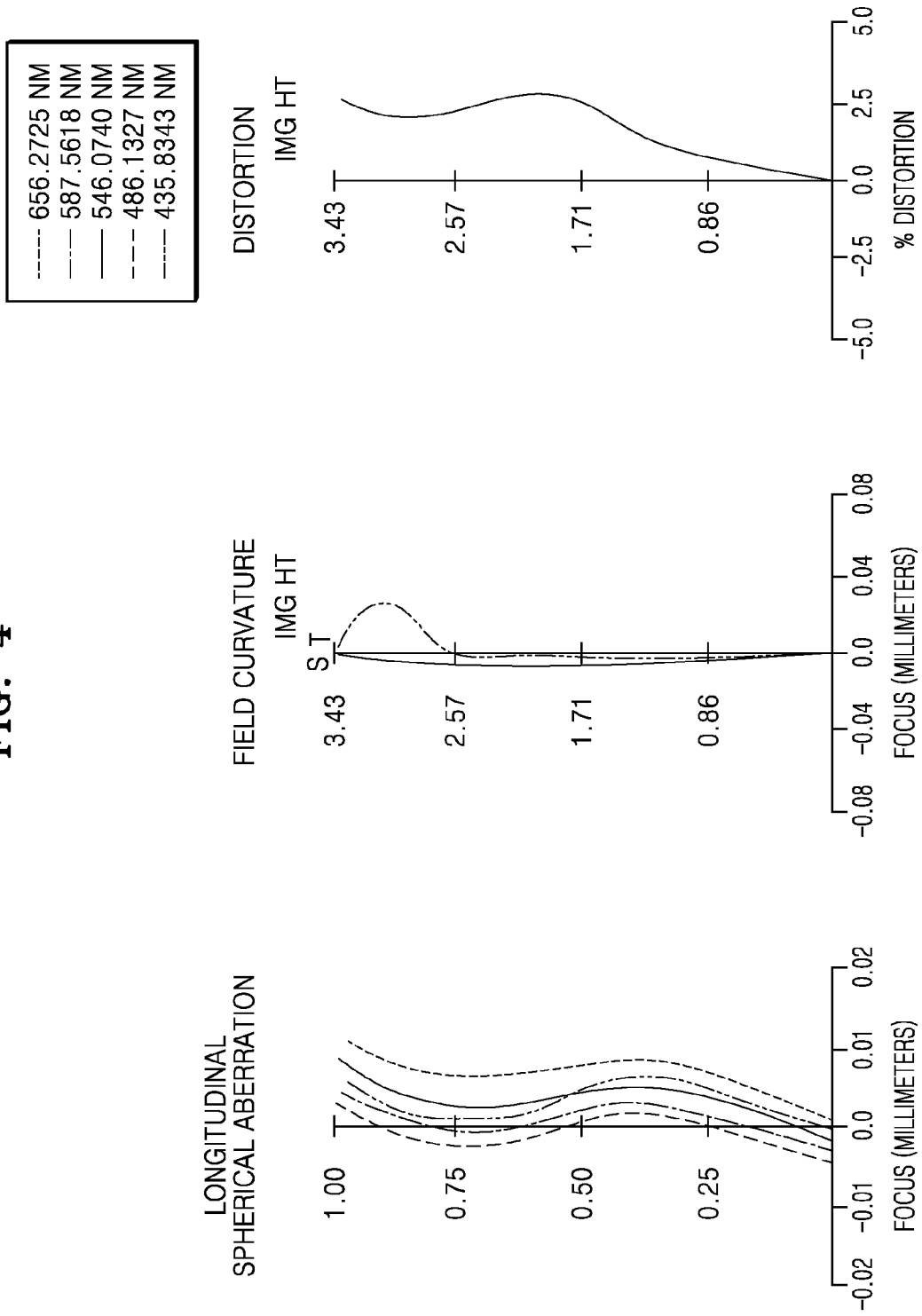
FIG. 4 is a graph of aberration of the photographing lens group of FIG. 3.

FIG. 4 is a graph of longitudinal spherical aberration, field curvature, and distortion of the photographing lens group L of FIG. 3.

Figure 5:
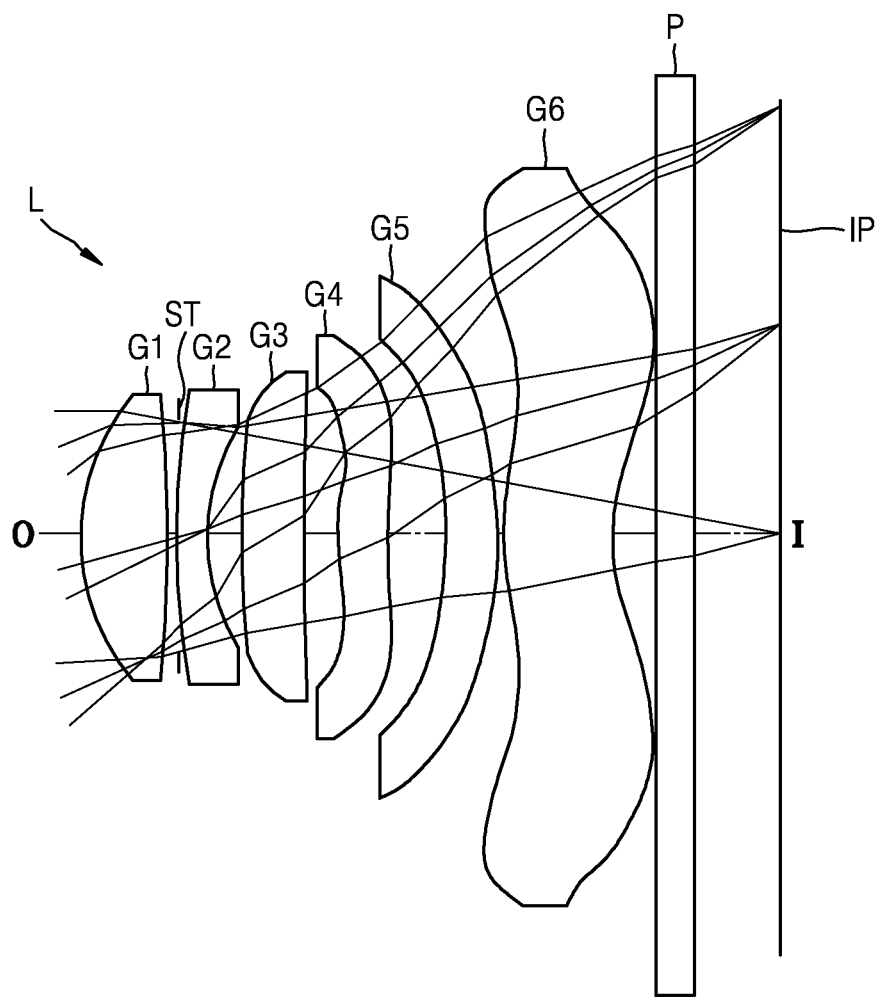
FIG. 5 is a diagram of a photographing lens group according to another embodiment.

FIG. 5 is a diagram of a photographing lens group L according to another embodiment, and design data of FIG. 5 is shown in Table 5 below. According to the present embodiment, an effective focal length (f) of the photographing lens group L is 4.542 mm, a focal length ($f_1$) of a first lens G1 is 3.061 mm, a focal length ($f_2$) of a second lens G2 is −4.961 mm, a focal length ($f_3$) of a third lens G3 is −48.127 mm, a focal length ($f_4$) of a fourth lens G4 is 20.492 mm, a focal length ($f_5$) of a fifth lens G5 is −14.033 mm, and a focal length ($f_6$) of a sixth lens G6 is 42.411 mm.

TABLE 5

| Lens surface Number | Radius of Curvature | Thickness | Refractive Index | |
|---|---|---|---|---|
| S1 | 1.725 | 0.638 | 1.535 | First lens G1 |
| S2 | −28.049 | 0.025 | | |
| S3 | 3.657 | 0.260 | 1.635 | Second lens G2 |
| S4 | 1.646 | 0.282 | | |
| S5 | 11.587 | 0.483 | 1.535 | Third lens G3 |
| S6 | 20.7667 | 0.289 | | |
| S7 | 7.532 | 0.369 | 1.535 | Fourth lens G4 |
| S8 | 23.697 | 0.457 | | |
| S9 | −1.750 | 0.397 | 1.635 | Fifth lens G5 |
| S10 | −2.370 | 0.025 | | |
| S11 | 1.660 | 0.875 | 1.535 | Sixth lens G6 |
| S12 | 1.463 | 0.331 | | |
| S13 | infinity | 0.300 | 1.517 | Optical filter P |
| S14 | infinity | 0.669 | | |
| S15 | infinity | 0 | | Image plane IP |

Table 6 shows a conic constant K and aspheric coefficients A, B, C, D, and E of the present embodiment.

TABLE 6

| | K | A | B | C | D | E |
|---|---|---|---|---|---|---|
| S1 | 0.018889 | 0.000459 | −0.000479 | −0.009310 | 0.010572 | −0.003179 |
| S2 | −99.990000 | 0.029194 | −0.017686 | 0.003616 | −0.001564 | −0.003267 |
| S3 | −15.908260 | −0.020080 | 0.044727 | −0.037280 | 0.006593 | 0.008092 |
| 4 | −5.052966 | 0.053238 | 0.007489 | 0.020637 | −0.007657 | 0.001185 |
| 5 | 0.000000 | −0.007620 | −0.005881 | 0.012904 | 0.004372 | 0.009936 |
| 6 | 0.000000 | −0.043510 | −0.007570 | 0.004829 | 0.000741 | −0.008274 |
| 7 | −21.123850 | −0.072730 | −0.027775 | −0.003990 | −0.000770 | 0.000068 |
| 8 | 0.000000 | −0.011690 | −0.067131 | 0.044502 | −0.030672 | 0.015898 |
| 9 | −18.422420 | 0.062255 | −0.065276 | 0.009882 | −0.005958 | 0.004990 |
| 10 | 0.187003 | 0.136916 | −0.074376 | 0.014403 | 0.000419 | −0.000380 |
| 11 | −12.591430 | −0.060760 | 0.004494 | 0.001467 | −0.000200 | −0.000003 |
| 12 | −6.346325 | −0.040620 | 0.008240 | −0.001750 | 0.000244 | −0.000022 |

In the present embodiment, respective values of Inequalities 1, 2, 3, 4, and 5 satisfy:

$CT_6/CT_5 = 2.204$ $TTL/DI = 0.787$ $|f_1/f_3| + |f_1/f_4| = 0.213$ $|f/f_5| + |f/f_6| = 0.431$ $|V_{d4} - V_{d5}| = 32.1$

Figure 6:
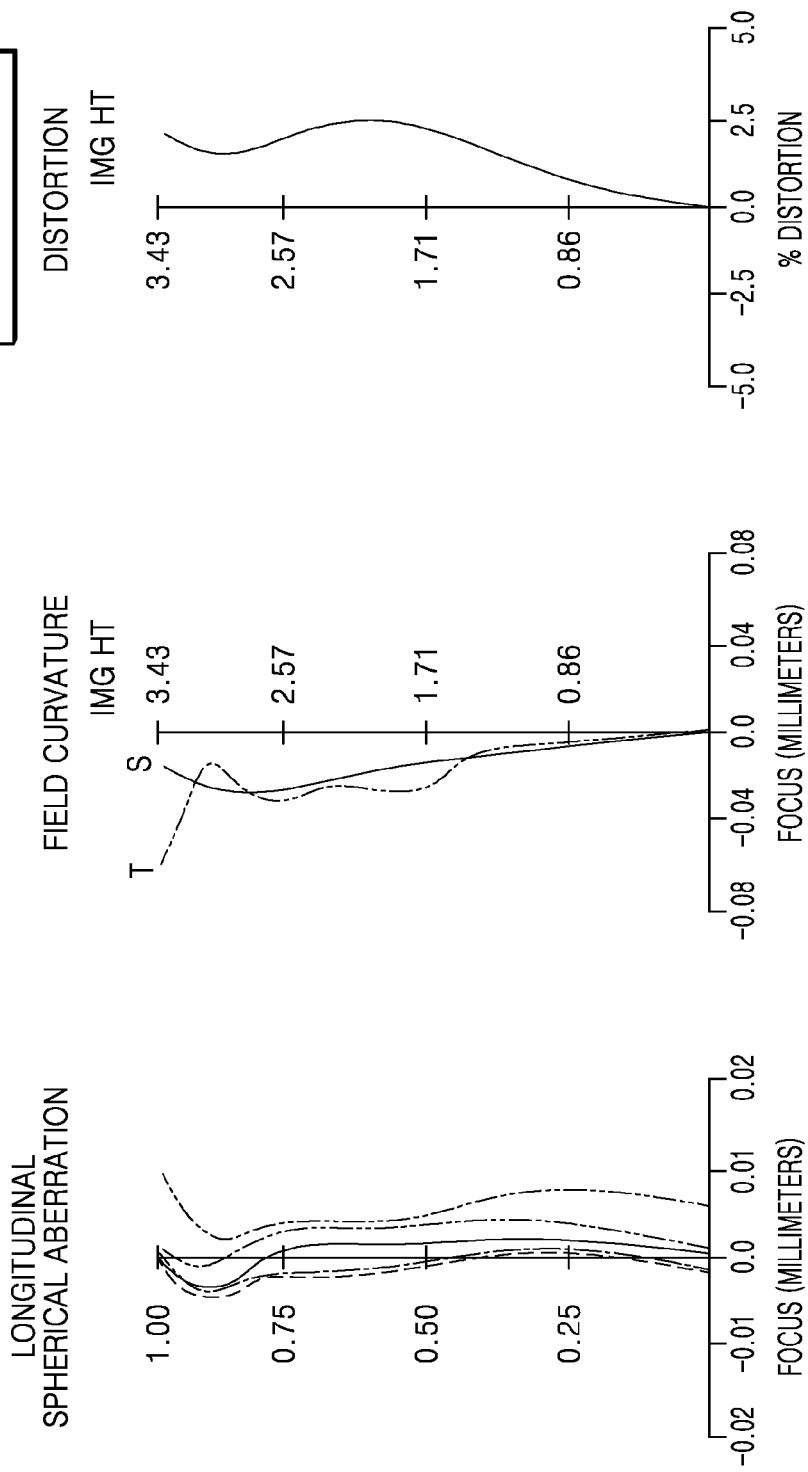
FIG. 6 is a graph of aberration of the photographing lens group of FIG. 5.

FIG. 6 is a graph of longitudinal spherical aberration, field curvature, and distortion of the photographing lens group L of FIG. 5.

Figure 7:
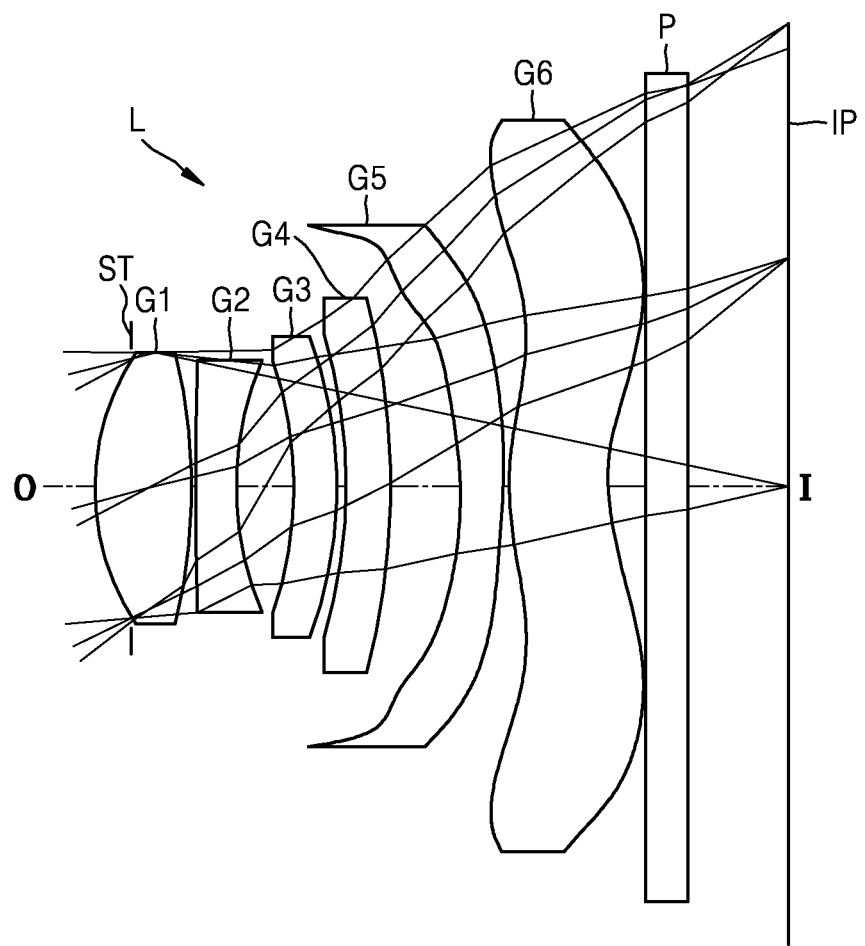
FIG. 7 is a diagram of a photographing lens group according to another embodiment.

FIG. 7 is a diagram of a photographing lens group L according to an embodiment, and design data of FIG. 7 is shown in Table 7 below. According to the present embodiment, an effective focal length (f) of the photographing lens group L is 4.572 mm, a focal length ($f_1$) of the first lens G1 is 2.444 mm, a focal length ($f_2$) of the second lens G2 is −3.979 mm, a focal length ($f_3$) of the third lens G3 is 94.702 mm, a focal length ($f_4$) of the fourth lens G4 is 31.565 mm, a focal length ($f_5$) of the fifth lens G5 is −11.028 mm, and a focal length ($f_6$) of the sixth lens G6 is 202.963 mm.

TABLE 7

| Lens surface Number | Radius of Curvature | Thickness | Refractive Index | |
|---|---|---|---|---|
| S1 | 1.627 | 0.727 | 1.535 | First lens G1 |
| S2 | −5.612 | 0.030 | | |
| S3 | −27.882 | 0.300 | 1.640 | Second lens G2 |
| S4 | 2.813 | 0.447 | | |
| S5 | −4.970 | 0.304 | 1.535 | Third lens G3 |
| S6 | −4.622 | 0.080 | | |
| S7 | −8.425 | 0.340 | 1.640 | Fourth lens G4 |
| S8 | −6.038 | 0.520 | | |
| S9 | −1.685 | 0.340 | 1.535 | Fifth lens G5 |
| S10 | −2.525 | 0.030 | | |
| S11 | 1.562 | 0.742 | 1.535 | Sixth lens G6 |
| S12 | 1.323 | 0.306 | | |
| S13 | infinity | 0.300 | 1.517 | Optical filter P |
| S14 | infinity | 0.756 | | |
| S15 | infinity | 0.000 | | image plane IP |

Table 8 shows a conic constant K and aspheric coefficients A, B, C, D, and E of the present embodiment.

TABLE 8

| | K | A | B | C | D | E |
|---|---|---|---|---|---|---|
| S1 | −0.074100 | −0.003965 | −0.003830 | −0.015610 | 0.017126 | −0.014429 |
| S2 | −66.229700 | 0.048530 | −0.031820 | −0.046034 | −0.001334 | 0.028019 |
| S3 | −99.000000 | 0.072251 | 0.015137 | −0.071011 | 0.011572 | 0.039280 |
| S4 | −20.614700 | 0.104574 | −0.015810 | 0.044899 | −0.016522 | −0.018792 |
| S5 | 15.279870 | −0.105594 | 0.077662 | 0.006818 | −0.004678 | −0.015546 |
| S6 | 7.779961 | −0.091696 | 0.032247 | 0.049058 | −0.020148 | −0.020550 |
| S7 | −35.981900 | −0.015217 | −0.067810 | 0.040835 | 0.006372 | −0.015520 |
| S8 | −99.000000 | −0.017590 | −0.050380 | 0.034878 | −0.016749 | 0.012659 |
| S9 | −27.132700 | 0.066776 | −0.090850 | 0.021514 | −0.010423 | 0.006811 |
| S10 | −10.535800 | 0.129261 | −0.102060 | 0.022351 | 0.000975 | −0.001080 |
| S11 | −17.826800 | −0.049192 | 0.001556 | 0.001573 | −0.000173 | −0.000002 |
| S12 | −7.781790 | −0.038898 | 0.006454 | −0.001401 | 0.000214 | −0.000022 |

In the present embodiment, respective values of Inequalities 1, 2, 3, 4, 5 satisfy:

$$CT_6/CT_5 = 2.18$$

$$TTL/DI = 0.761$$

$$|f_1/f_3| + |f_1/f_4| = 0.103$$

$$|f/f_5| + |f/f_6| = 0.437$$

$$|V_{d4} - V_{d5}| = 33$$

Figure 8:
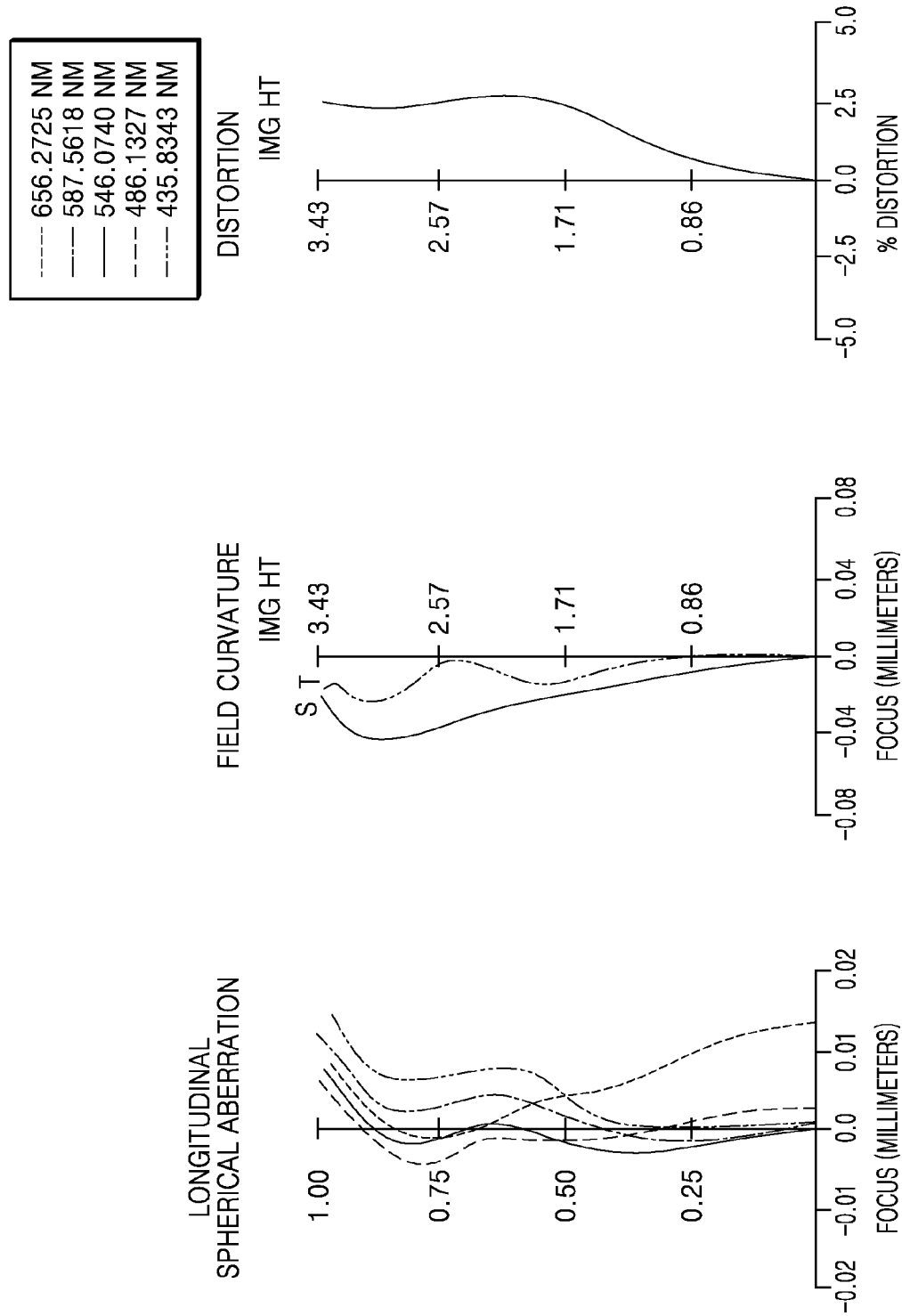
FIG. 8 is a graph of aberration of the photographing lens group of FIG. 7.

FIG. 8 is a graph of longitudinal spherical aberration, field curvature, and distortion of the photographing lens group L of FIG. 7.

As described above, according to the various embodiments, a photographing lens group includes six lenses, and appropriately distributes refractive powers of the six lenses so that aberration is reduced and a high definition image is obtained. In addition, an overall length of the photographing lens group may be reduced, and thus, a compact optical system may be provided.

The photographing lens group according to the various embodiments may be used in electronic apparatuses that include an image sensor, such as digital cameras, video cameras, mobile phone cameras, and cameras in compact mobile devices.

Figure 9:
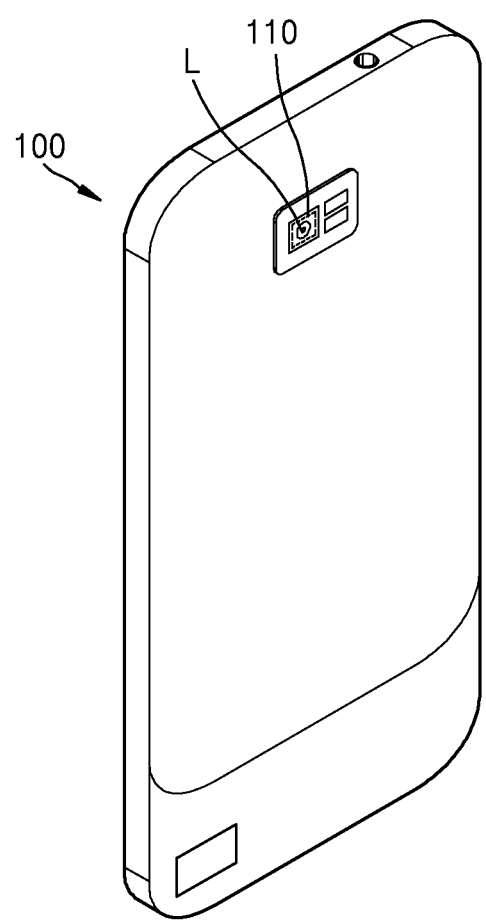
FIG. 9 is a schematic perspective view of an electronic apparatus according to an embodiment.

FIG. 9 is a schematic perspective view of an electronic apparatus 100 according to an embodiment. FIG. 9 illustrates an example in which the electronic apparatus 100 is implemented as a mobile phone or similar photographing apparatus, but is not limited thereto. The electronic apparatus 100 includes a photographing lens group L, and an image sensor 110 that receives an image formed by the photographing lens group L and converts the image into an electric image signal. Any of the photographing lens groups described with reference FIG. 1, 2, 3, 4, 5, 6, 7, or 8 may be used as the photographing lens group L of the electronic apparatus 100. A compact high-performance electronic apparatus may be implemented by applying the photographing lens group L according to the embodiments to an electronic apparatus such as a digital camera or a mobile phone camera.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A photographing lens group comprising:
a first lens having a positive refractive power;
a second lens having a negative refractive power;
a third lens having a positive refractive power;
a fourth lens having a positive or negative refractive power;
a fifth lens having a negative refractive power; and
a sixth lens having a positive refractive power, wherein the sixth lens comprises at least one inflection point on at least one of an image side surface or an object side surface thereof;
wherein the first, second, third, fourth, fifth, and sixth lenses are sequentially arranged from an object side to an image side of the photographing lens group;
the third lens is a biconvex lens;
wherein the photographing lens group satisfies an inequality of:

$$1.0 < CT_6/CT_5 < 3.5;$$

where $CT_5$ is a thickness of the fifth lens with respect to an optical axis, and $CT_6$ is a thickness of the sixth lens with respect to the optical axis; and
wherein the photographing lens group satisfies an inequality of:

$$0.1 < TTL/DI < 0.8;$$

where TTL is a distance from an object side surface of the first lens to an image plane, and DI is a diagonal length of an image sensor.

2. The photographing lens group of claim 1, wherein an object side surface of the sixth lens is convex near the optical axis.

3. The photographing lens group of claim 1, wherein the photographing lens group satisfies an inequality of:

$$0 < |f_1/f_3| + |f_1/f_4| < 1.0;$$

where $f_1$ is a focal length of the first lens, $f_3$ is a focal length of the third lens, and $f_4$ is a focal length of the fourth lens.

4. The photographing lens group of claim 1, wherein the photographing lens group satisfies an inequality of:

$$0 < |f/f_5| + |f/f_6| < 1.0;$$

where $f_5$ is a focal length of the fifth lens, $f_6$ is a focal length of the sixth lens, and f is a focal length of the photographing lens group.

5. The photographing lens group of claim 1, wherein the photographing lens group satisfies an inequality of:

$$25 < |V_{d4} - V_{d5}| < 50;$$

where $V_{d4}$ is an Abbe number of the fourth lens, and $V_{d5}$ is an Abbe number of the fifth lens.

6. The photographing lens group of claim 1, wherein the first, second, third, fourth, fifth, and sixth lenses each have at least one aspheric surface.

7. The photographing lens group of claim 1, wherein the first, second, third, fourth, fifth, and sixth lenses are bi-aspheric lenses.

8. The photographing lens group of claim 1, wherein the fifth lens has a meniscus shape having a convex surface facing the image side.

9. The photographing lens group of claim 1, further comprising a stop provided at an object side of the first lens, or between the first lens and the second lens.

10. The photographing lens group of claim 1, wherein the first lens has a convex surface facing the object side.

11. The photographing lens group of claim 10, wherein the first lens is a biconvex lens.

12. The photographing lens group of claim 1, wherein the second lens has a concave surface facing the image side.

13. The photographing lens group of claim 12, wherein the second lens is a meniscus lens or a biconcave lens.

14. The photographing lens group of claim 1, wherein an image side surface of the sixth lens is concave near the optical axis.

15. An electronic apparatus comprising:
a photographing lens group; and
an image sensor that receives an image formed by the photographing lens group and converts the image into an electric image signal;
wherein the photographing lens group comprises:
- a first lens having a positive refractive power;
- a second lens having a negative refractive power;
- a third lens having a positive refractive power;
- a fourth lens having a positive or negative refractive power;
- a fifth lens having a negative refractive power; and
- a sixth lens having a positive refractive power, wherein the sixth lens comprises at least one inflection point on at least one of an image side surface or an object side surface thereof;
- wherein the first, second, third, fourth, fifth, and sixth lenses are sequentially arranged from an object side to an image side of the photographing lens group;
- the third lens is a biconvex lens;
- wherein the photographing lens group satisfies an inequality of:

$$1.0 < CT_6/CT_5 < 3.5;$$

where $CT_5$ is a thickness of the fifth lens with respect to an optical axis, and $CT_6$ is a thickness of the sixth lens with respect to the optical axis; and wherein the photographing lens group satisfies an inequality of:

$$0.1 < TTL/DI < 0.8;$$

where TTL is a distance from an object side surface of the first lens to an image plane, and DI is a diagonal length of an image sensor.

16. A photographing lens group comprising:
a first lens having a positive refractive power;
a second lens having a negative refractive power;
a third lens having a positive refractive power;
a fourth lens having a positive or negative refractive power;
a fifth lens having a negative refractive power; and
a sixth lens having a positive refractive power, wherein the sixth lens group comprises at least one inflection point on at least one of an image side surface or an object side surface thereof;
wherein the first, second, third, fourth, fifth, and sixth lenses are sequentially arranged from an object side to an image side of the photographing lens group;
wherein the third lens is a biconvex lens; and
wherein the photographing lens group satisfies an inequality of:

$$1.0 < CT_6/CT_5 < 3.5;$$

where $CT_5$ is a thickness of the fifth lens with respect to an optical axis, and $CT_6$ is a thickness of the sixth lens with respect to the optical axis.

* * * * *